UNITED STATES PATENT OFFICE.

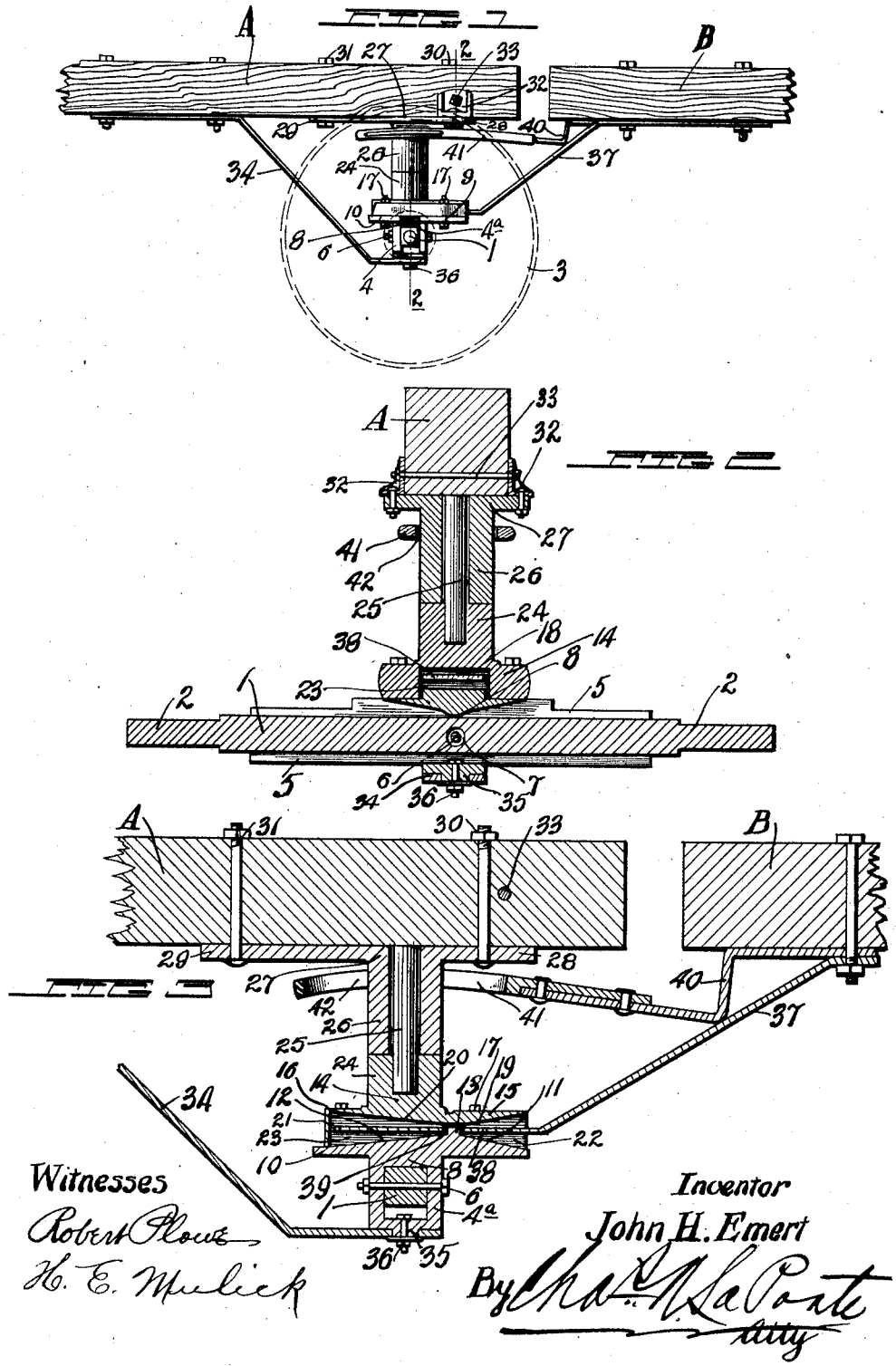
J. H. EMERT.
TRUCK FOR AGRICULTURAL IMPLEMENTS.
APPLICATION FILED JULY 16, 1910.
1,038,325.
Patented Sept. 10, 1912.

JOHN H. EMERT, OF PEORIA, ILLINOIS, ASSIGNOR TO EMERT MANUFACTURING COMPANY, OF PLEASANT HILL, ILLINOIS, A CORPORATION OF ILLINOIS.

TRUCK FOR AGRICULTURAL IMPLEMENTS.

1,038,325.    Specification of Letters Patent.     Patented Sept. 10, 1912.

Application filed July 16, 1910. Serial No. 572,367.

*To all whom it may concern:*

Be it known that I, JOHN H. EMERT, a citizen of the United States, residing at Peoria, in the county of Peoria and State of Illinois, have invented certain new and useful Improvements in Trucks for Agricultural Implements, of which the following is a specification.

This invention has reference to trucks and has for its object to provide a truck to be used in connection with agricultural implements, such as disk harrows, harvesters and binders, etc., for supporting the weight of the forward connections of such machines and draft appliances and thereby relieve the animals of such weight.

The invention consists essentially of an axle capable of being oscillated in two different directions; horizontally, for steering the machine in different directions and vertically so that the truck will accommodate itself to the uneveness of the ground. A steering tongue is provided and so connected with the axle that the axle may be swung from right to left or vice versa and also up and down.

That the invention may be more fully understood, reference is had to the accompanying drawings, forming a part of the description, in which:—

Figure 1 is a greatly reduced side elevation of a truck embodying my improvements; Fig. 2 is an enlarged vertical and transverse section as the same would appear if taken on the line 2—2 of Fig. 1; Fig. 3 is a vertical longitudinal section of the truck, on the same scale as Fig. 2.

Like numerals of reference indicate corresponding parts throughout the figures.

The stub-tongue is designated A. This is the tongue which is attached to and extends forwardly from the implement, and is intended to support or have attached thereto the usual draft appliances, not shown.

The steering-tongue is designated B, and is the tongue employed to control the direction of movement of the truck, being so connected with the axle of the truck that upon being shifted to the right or to the left it will cause the axle to also turn in a similar direction.

1 denotes the axle, said axle being a bar, the body of which is preferably rectangular in cross-section and having the wheel carrying spindles 2, to support the wheels 3, shown in dotted lines in Fig. 1. The axle 1 is carried through a casting 4 which is provided with the centrally disposed bearing portion $4^a$ from which extend in opposite directions the spaced and parallel bars 5, terminating at a point short of the inner ends of the wheel spindles 2. The body of the axle lies between the bars 5 and adjacent thereto which serve to strengthen the axle and relieve the axle from unnecessary strain when turning. The connection between the axle 1 and bearing portion $4^a$ of the casting 4 comprises a pin or bolt 6 passing transversely through the axle, see Figs. 2 and 3, and secured in the bearing portion $4^a$. The opening 7 in the axle through which the bolt 6 passes is sufficiently large so that there will be no bearing of the axle on the pin, which is further relieved by the fulcrum portion 8 in the upper wall of the bearing portion $4^a$ against which the upper surface of the axle bears and on which the axle will oscillate in a vertical plane, so that the axle will accommodate itself to the uneveness of the ground. The fulcrum portion 8 is merely a depending enlargement, as shown in Fig. 2 having a convex face on which the axle will ride, the bolt or pin 6 serving only to hold the axle in operative position. The top portion of casting 4 extends forwardly and rearwardly of its bearing portion $4^a$, as at 9 and 10, and the upper surface of said portions 9 and 10 converge upwardly toward each other as at 11 and 12, presenting inclined surfaces in opposite directions which unite or merge into a short vertical stud or pin 13. The function of such inclined surfaces and stud or pin will be further explained.

14 denotes a casting supported above the casting 4, having the forwardly and rearwardly extended base portions 15 and 16, similar to the portions 9 and 10 of the casting 4, and bolted thereto by bolts 17, see Fig. 1. The under face of the casting 14 is channeled out, as at 18, see Fig. 2 to receive the casting 4 in manner shown, the upper wall of the channel portion 15 being beveled or inclined inwardly and downwardly as at 19, starting from the front end and terminating above the pin or stud 13 in the casting 4, while the upper wall of the portion 16 is beveled or inclined upwardly and rearwardly, as at 20, merging into a rear vertical wall 21. When the casting 14 is bolted on the casting 4, the inclined faces 9 and 15 of the respective castings converge toward each other from the forward end, forming a chamber or recess 22 having vertical side walls and upper and lower inclined walls, and the inclined faces 12 and 20 of said castings 4 and 14, diverging as they do from a point coincident with the stud 13 to the rear end of the castings, form a chamber or recess 23, similar to the chamber or recess 22. The functions of such chambers or recesses will be further explained.

The casting 14 has a short vertically disposed projection 24, preferably cylindrical in shape which serves as a base for a center-pin 25 projecting axially therefrom and above the same, and also as a support for a similar projection or bearing portion 26 depending from a casting 27, which has the forwardly and rearwardly extended tongue bearing portions 28 and 29. The pin 25 is securely fixed in the projection 24 of the casting 14 and is loosely carried in the casting 27, to allow for turning the casting 4 and 14 and the pin 25 in the bearing 26, as will more fully appear.

The stub-tongue A extends longitudinally of and across the portions 28 and 29 of the casting 27, being bolted thereto as at 30 and 31, and said tongue near the forward end of the portion 28 of the casting 27 is carried between ears 32 attached to said casting 27, and secured thereto by a transverse bolt 33. The parts are braced by a brace-bar 34 bolted to the underside of the stub-tongue and extending downwardly and forwardly having its front end connected to the lower face of the bearing portion 4 of the casting 4, preferably by forming a depending stud 35 on the lower face of the casting 4 over which the end of the brace-bar 34 is carried and the parts held in operative position by a bolt 36. In this way the turning of the casting 4 and axle 1 are not affected by the brace-bar connection 34.

To the lower face of the steering tongue B is secured a strap 37 which is carried downwardly and rearwardly from said tongue and provided with the horizontal rear extension 38, which is operatively connected with the castings 4 and 14 in the chambers or recesses 22 and 23. The strap 37 is provided with a perforation 39 in its horizontal extension 38 which is fitted over the pin or stud 13 of the casting 4, before securing the casting 14 in place. When said casting 14 is fastened in place, it will be observed that the pin or stud 13 will prevent the strap 37 from becoming disconnected from said stud or pin 13, but that the strap 37 or its extension 38 may oscillate up and down, owing to the inclination of the matching walls 11 and 19, and 12 and 20 of the castings 4 and 14, which will permit of vertical oscillation of the steering tongue B, sufficient for all purposes. The strap 37 fits easily in the chambered portion 18 of the casting 14, and its opening or perforation 39 is sufficiently large to allow the strap to oscillate on the pin or stud 13, in the manner explained. The steering tongue B is oscillated from side to side through the connection of the strap 37 between said tongue and the castings 4 and 14, the strap bearing against the sides of the casting 14 causing said castings 14 and 4 and the axle 1 to be turned with the pivot-pin rotating in the bearing 26 of the casting 27. To prevent twisting of the strap 37 when turning the axle 1, I provide the strap or bar 40 secured to the tongue B which, at its rear end is secured to a curved bar 41 having an elongated slot 42 through which is carried the bearing 26 of the casting 27, to allow the bar to have movement transversely of the bearing 26, when the tongue B is raised or lowered.

The truck as described is serviceable in connection with harvesters and binders and disk harrows where a truck has special advantages, and may be used advantageously in connection with other and various types of farm implements. The steering tongue has the advantage of being capable of being raised and lowered and the axle, in addition to being swung from side to side by said steering tongue is also adapted to accommodate itself to the unevenness in the ground.

What I claim is:—

1. In a device of the character described, in combination, supporting means, an axle having a pivotal relation with said supporting means both horizontally and vertically, a steering tongue, a bar connected with said tongue and axle and capable of movement in a horizontal and a vertical plane, and a guiding means also connected with said tongue and movable transversely of said supporting means.

2. In a device of the character described, in combination, a stub-tongue, a casting secured to said tongue, an axle, a support between the axle and casting and rotatably connected with said casting, a steering-tongue, a bar connected with said steering-tongue and with said support, the connection between the bar and support permitting the bar to oscillate in a vertical plane.

3. In a device of the character described, in combination, a stub-tongue, a casting secured to said tongue, a support having a pivotal relation with said casting, an axle connected with the support and adapted to oscillate in a vertical plane, a steering tongue, a bar connected with said steering tongue and having a pivotal connection with said support, and guiding means attached to the steering tongue and movable across the vertical axis of the axle.

4. In a device of the character described, in combination, a stub-tongue, a support pivotally connected with the tongue, an axle having a pivotal relation with said support, a brace bar on the support extending parallel with the axle, a steering-tongue, a bar connected with said steering-tongue and having a pivotal relation with the support, and guiding means connected with the steering-tongue and movable across the vertical axis of the axle.

5. In a device of the character described, in combination, a stub-tongue, a support having a pivotal connection with said tongue, said support composed of two parts, the matching faces of said parts having oppositely disposed inclined faces forming recesses between said parts, an axle having a pivotal relation with the lower part of said support, a steering-tongue, a bar connected at one end to the tongue, its opposite end extending through the recesses in the support and pivotally connected thereto, and guiding means connected with the steering tongue and movable across the pivotal connection between support and stub-tongue.

6. In a device of the character described, in combination, a stub tongue, a support having a pivotal connection with said tongue, said support composed of two parts, the face of one of said parts having two oppositely inclined portions and the face of the other of said parts having two correspondingly, oppositely inclined portions merging into a stud, these corresponding faces forming recesses between said parts, an axle having a pivotal relation with the lower part of said support, a steering tongue, a bar connected at one end to said tongue, its opposite end extending through the recesses in the support and connected to said stud, and guiding means connected with the steering tongue and movable across the pivotal connection between the support and stub tongue.

7. In a device of the character described, a stub tongue, a support having a pivotal connection with said tongue, said support composed of two parts, the face of the upper part having oppositely inclined portions and the oppositely disposed face of the lower part having oppositely inclined portions corresponding thereto and merging into a stud, said oppositely disposed inclined portions forming recesses between said parts, an axle having a pivotal relation with the lower part of said support, a steering tongue, a bar connected at one end to the tongue, its opposite end extending through the recesses in the support and pivotally connected to said stud, and guiding means connected with the steering tongue and movable across the pivotal connection between the support and stub tongue.

8. In the device of the character described, a stub tongue, a support having a pivotal connection with said tongue, said support composed of two parts, the upper of said parts having its lower face provided with downwardly inclined portions meeting at an angle, the lower one of said parts having upwardly inclined faces meeting at an angle and merging into a stud in a position corresponding to the angle in which the inclined portions of the face of the upper part meet, said oppositely disposed inclined portions of the faces of the two parts forming recesses between said parts, said lower part having a centrally disposed bearing portion, and spaced parallel bars extending therefrom in opposite directions, an axle mounted between said spaced and parallel bars and pivotally connected thereto and bearing against said bearing portion, a steering tongue, a bar connected at one end to the tongue, its opposite end extending through the recesses in the support and pivotally connected thereto, and guiding means connected to the steering tongue and movable across the pivotal connection between the support and stub tongue.

9. In the device of the character described, a stub tongue, a support having a pivotal connection with said tongue, said support composed of two parts, the upper of said parts having its lower face provided with downwardly inclined portions meeting at an angle, the lower one of said parts having upwardly inclined faces meeting at an angle, and merging into a stud in a position corresponding to the angle in which the inclined portions of the face of the upper part meet, said oppositely disposed inclined portions of the faces of the two parts forming recesses between said parts, said lower part having a centrally disposed bearing portion, and spaced parallel bars extending therefrom in opposite directions, an axle mounted between said spaced and parallel bars and pivotally connected thereto and bearing against said bearing portion, a steering tongue, a bar connected at one end to the tongue, its opposite end portion extending through the recesses in said support and being formed with a perforation embracing said stud, and guiding means connected with the steering tongue, comprising a bar, having secured thereto a curved bar which is provided with an elongated slot embracing the pivotal connection between the support and stub tongue.

In testimony whereof I affix my signature, in presence of two witnesses.

JOHN H. EMERT.

Witnesses:
CHAS. N. LA PORTE,
ROBERT PLOWE.

Copies of this patent may be obtained for five cents each, by addressing the "Commissioner of Patents, Washington, D. C."